United States Patent [19]

Albrecht et al.

[11] Patent Number: 4,637,962
[45] Date of Patent: * Jan. 20, 1987

[54] COMPOSITE MATERIAL IN ROD, TUBE, STRIP, SHEET OR PLATE SHAPE WITH REVERSIBLE THERMOMECHANICAL PROPERTIES AND PROCESS FOR ITS PRODUCTION

[75] Inventors: Joachim Albrecht, Mülligen, Switzerland; Thomas Duerig, Fremont, Calif.

[73] Assignee: BBC Brown Boveri & Company Limited, Baden, Switzerland

[*] Notice: The portion of the term of this patent subsequent to May 21, 2002 has been disclaimed.

[21] Appl. No.: 586,837

[22] Filed: Mar. 6, 1984

[30] Foreign Application Priority Data

Mar. 14, 1983 [CH] Switzerland .................. 1383/83-7

[51] Int. Cl.$^4$ .......................................... C23C 30/00
[52] U.S. Cl. ........................... 428/616; 428/617; 428/618; 428/619; 419/5; 228/263.18; 228/263.13; 249/83; 264/45.1
[58] Field of Search ........... 428/960, 615, 616, 617, 428/618, 619, 457, 458; 148/402, 31.5, 6; 75/200, 201, 246, 247; 264/45.1; 249/83; 228/263.18, 263.13; 419/6.38, 49.28, 5

[56] References Cited

U.S. PATENT DOCUMENTS 4,518,444 5/1985 Albrecht et al. .................. 418/402

Primary Examiner—L. Dewayne Rutledge
Assistant Examiner—Deborah Yee
Attorney, Agent, or Firm—Oblon, Fisher, Spivak, McClelland & Maier

[57] ABSTRACT

An article in rod, tube, strip, sheet or plate shape with reversible thermomechanical properties is produced by joining of at least two parts consisting of a total of at least one shape memory alloy having a two-way effect, whereby each part has a memory effect by itself. In the case of at least two shape memory alloys (1, 2) with different transition temperatures but the same mode of movement, the joining of the individual parts can take place prior to the deformation in the low temperature range necessary to inducing the two-way effect. In the case of differing types and degrees of movement of the individual parts (25, 26), their joining can first be accomplished only after the individual deformations of each part for itself in the low temperature range are accomplished regardless of how many shape memory alloys with different transition temperatures are used in the structure of the article.

17 Claims, 27 Drawing Figures

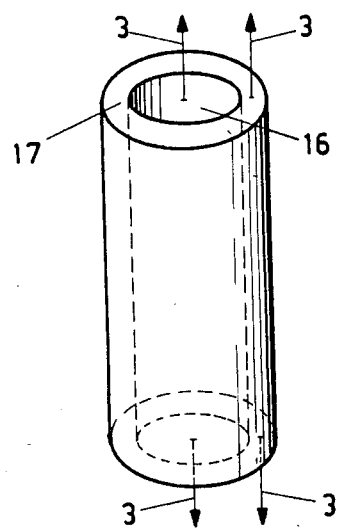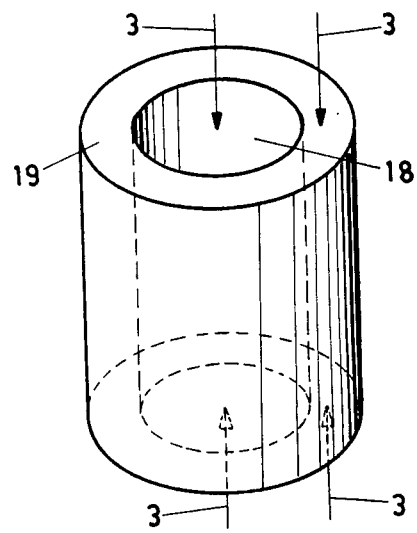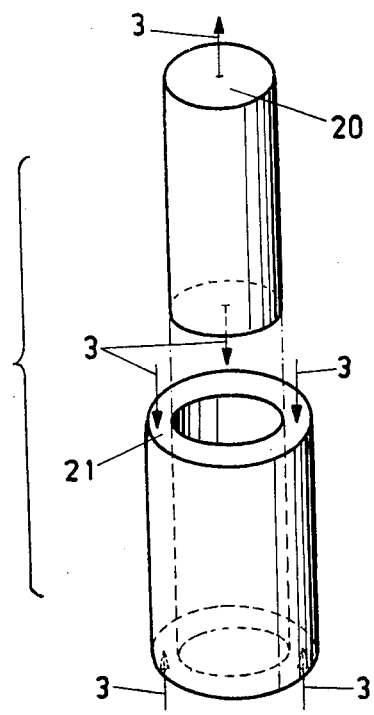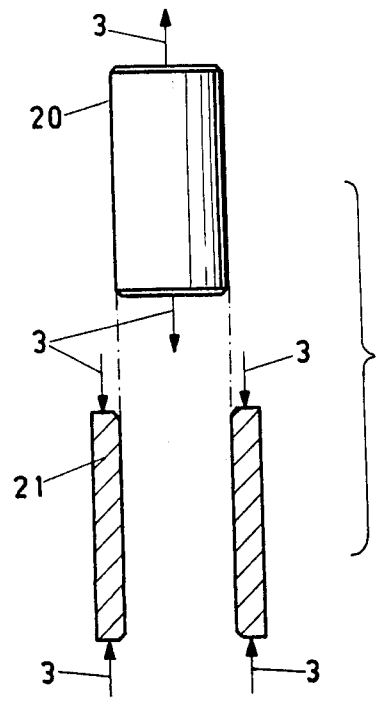

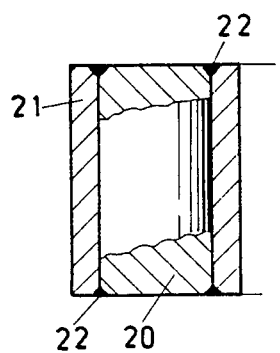
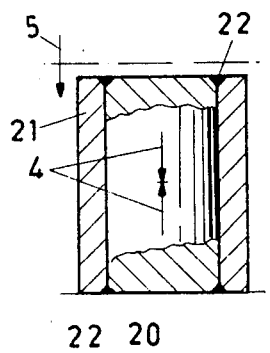
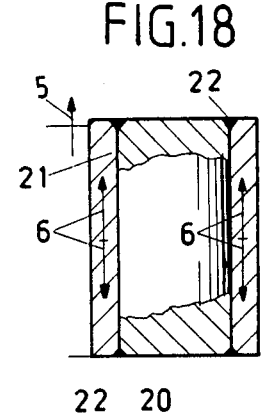
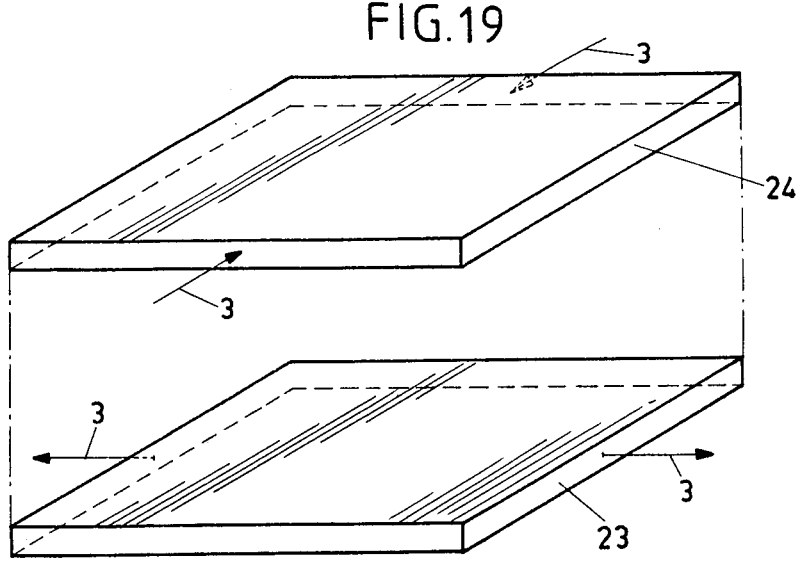
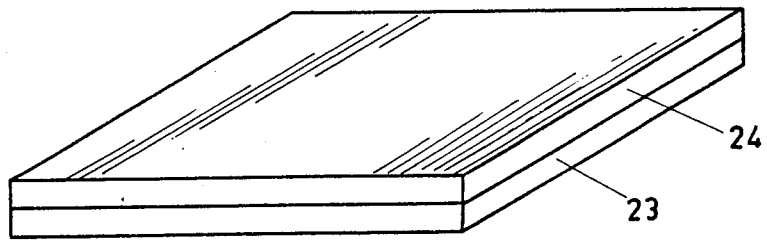

FIG.23  FIG.24
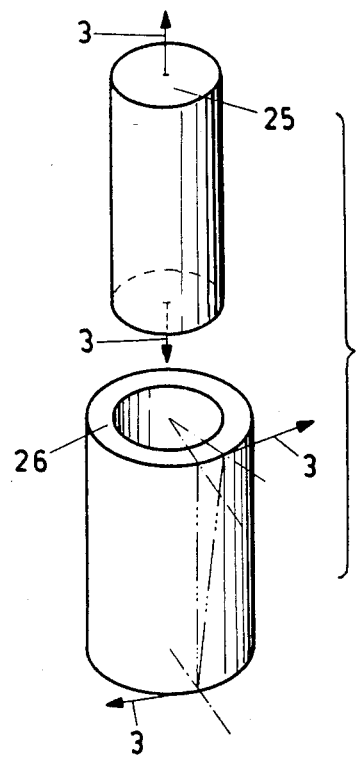
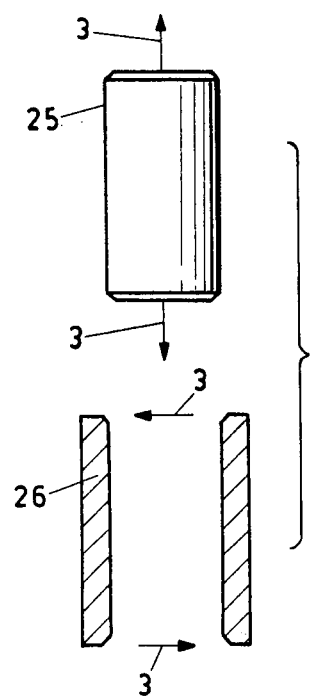
FIG.25  FIG.26  FIG.27
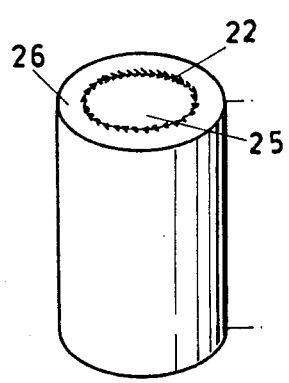
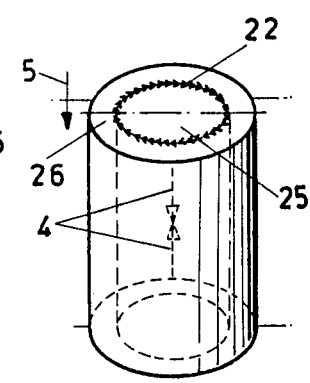
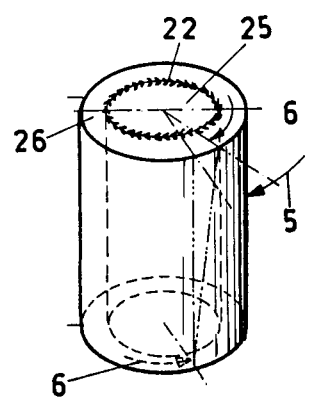

COMPOSITE MATERIAL IN ROD, TUBE, STRIP, SHEET OR PLATE SHAPE WITH REVERSIBLE THERMOMECHANICAL PROPERTIES AND PROCESS FOR ITS PRODUCTION

BACKGROUND OF THE INVENTION

1. Field of the Invention

The invention relates to a composite article which may be in rod, tube, strip, sheet or plate form and a process for its production into an article having reversible theremomechanical properties.

2. Description of the Prior Art

The so-called memory alloys belong to the materials that are distinguished by special thermomechanical properties deviating from normal behavior. Memory alloys include, among others, the alloys on Ni/Ti basis and the Cu alloys of the so-called β-brass type to mention only the most important ones. Their compositions, properties and uses are known from numerous publications (Walter S. Owen, "Shape Memory Effects in Alloys," edited by Jeff Perkins, 1975, Plenum Press New York, Proc. of int. Symposium on Shape Memory Effects and Applications, Toronto, Canada, May 19-22, 1975).

The shape memory alloys are distinguished because their phase transition (transition from the martensitic to the austenitic structural arrangement and vice versa) generally occurs within a small temperature interval of a magnitude of 30° C. This applies analogously also to the reversible shape changes connected with the transition regardless of their type and size.

In general, all temperatures for which shape changes are required cannot be carried out with a single shape memory alloy. Also, their thermomechanical properties are limited to a single type of deformation or to a single mode of movement in the transition range. Therefore there is a great need for materials which permit greater freedom to the design engineer in thermal as well as in mechanical characteristics.

SUMMARY OF THE INVENTION

The invention aims at specifying one article as well as one production process in which the shape changes take place at different tempertures or sizable shape changes and/or several types of shape changes and degrees are possible. It is possible to make the material available in a simple manner in rod, tube, strips, sheet or plate shape.

This aim is achieved by the fact that these composite articles are characterized by comprising at least two parts, whereby each part has a memory effect so that the entire article comprises at least one shape memory alloy having a two-way effect.

The invention is described by means of the embodiments below that are explained in greater detail by figures.

DESCRIPTION OF THE DRAWINGS

The figures show the following:

FIG. 12, an article consisting of two shape memory alloys in round rod shape for tensile stress following application of the external load in the low temperature range;

FIG. 13, an article consisting of two shape memory alloys in round rod shape for compression stress following application of the external load in the low temperature range;

FIG. 14, an article consisting of two shape memory alloys in round rod shape for tension/compression stress, following application of the external load in the low temperature range, in the state prior to joining together the individual parts, perspective view;

FIG. 15, the article according to FIG. 14 in plan view and section.

FIG. 16, the article according to FIG. 15 following joining together of the individual parts in the initial position;

FIG. 17, the article according to FIG. 16 during the passage of the transition in the high temperature range of the first shape memory alloy;

FIG. 18, the article according to FIG. 16 during the passage of the transition in the high temperature range of the second shape memory alloy;

FIG. 19, an article consisting of two shape memory alloys in sheet or plate shape for three-dimensional bending stress following application of the external load in the low temperature range in the state prior to the joining together of the individual parts;

FIG. 20, the article according to FIG. 19 following joining together of the individual parts, in the initial position;

FIG. 23, an article consisting of two shape memory alloys in round rod shape for tension/torsion stress following application of the external load in the low temperature range, in the state prior to joining together of the individual parts, perspective view;

FIG. 24, the article according to FIG. 23 in plan view and section.

FIG. 25, the article according to FIG. 23 following joining together of the individual parts, in the initial position;

FIG. 26, the article according to FIG. 25 during the passage of the transition in the high tempeature range of the first shape memory alloy;

FIG. 27, the article according to FIG. 25 during the passage of the transition in the high temperature range of the second shape memory alloy.

DESCRIPTION OF THE PREFERRED EMBODIMENTS

Figure 1:
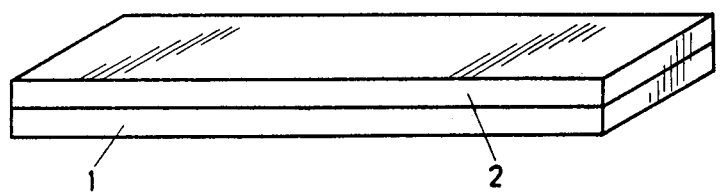
FIG. 1, an article consisting of two shape memory alloys in straight strip shape in the basic state in the initial position.

In FIG. 1, an article consisting of two shape memory alloys in straight strip shape is shown in perspective view. 1 represents a shape memory alloy A, 2 a shape memory alloy B. In general, A and B have different transition temperatures (points $A_S$ and $A_F$, respectively); 1 and 2 are firmly connected, e.g., by rolls (rollbond). The figure shows the article in the basic state in the initial position, i.e. prior to the inducing of the two-way effect. Geometrically this simultaneously corresponds to the position following the thermal treatment (solution heat treatment and quenching).

Figure 2:
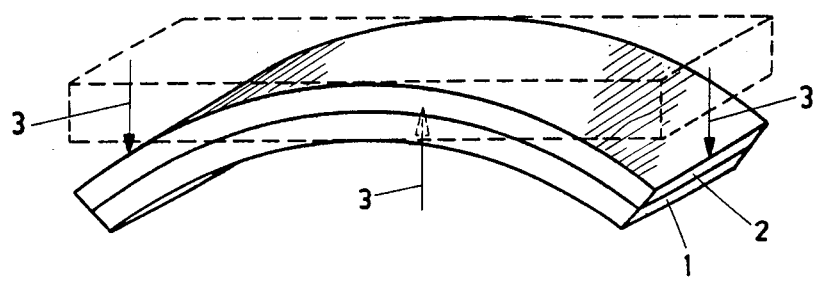
FIG. 2, an article according to FIG. 1 following application of the external load in the low temperature range.

FIG. 2 shows the article according to FIG. 1 during and after, respectively, application of the external load in the low temperature range for the purpose of inducing the two-way effect. In the case at hand, a bending deformation is involved. The direction of the applied external load is shown by arrows 3. The other reference symbols correspond to those of FIG. 1.

Figure 3:
FIG. 3, an article according to FIG. 1 during the passage of the transition in the high temperature range of the first shape memory alloy.

FIG. 3 shows the article according to FIG. 1 during the passage of the transition in the high temperature range of the first shape memory alloy, in this case alloy A. 1 expands, as indicated by the doublearrow 4. 2 for the time being is not involved in any internal structure change, but merely serves the mechanical balance. By expanding of 1 in direction 4, the article stretches and its ends make an external movement in direction 5.

Figure 4:
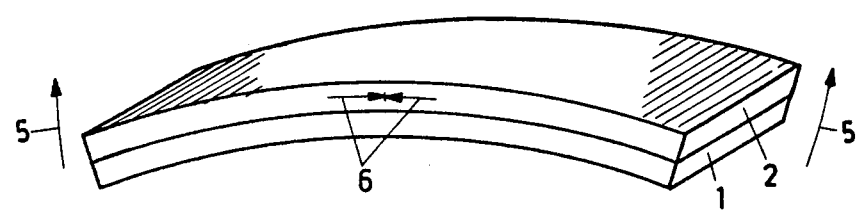
FIG. 4, an article according to FIG. 1 during the passage of the transition in the high temperature range of the second shape memory alloy.

In FIG. 4, the article according to FIG. 1 is represented during the passage of the transition in the high temperature range of the second shape memory alloy. Alloy B reaches the transition temperature, whereby 2 contracts. This is indicated by double arrow 6. The article carries out a further external movement according to direction 5 and becomes increasingly flat.

Figure 5:
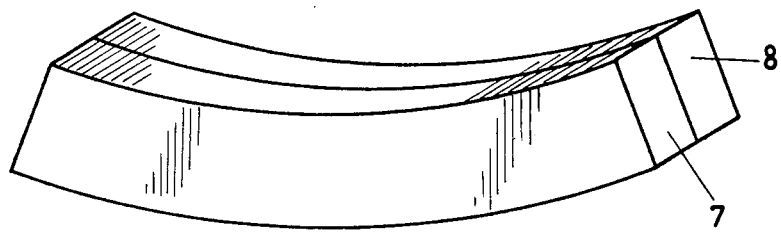
FIG. 5, an article consisting of two shape memory alloys in oblong rod shape bent at the ends in the basic state in the initial position.

FIG. 5 represents an article consisting of two shape memory alloys which are bent in the basic state and in the initial position. 7 refers to the shape memory alloy A, 8 to such an alloy B in oblong rod shape bent at the ends. Otherwise, the conditions explained in FIG. 1 apply. Linking of 7 and 8 by rolling, welding, soldering or joining together may take place prior to or following bending.

Figure 6:
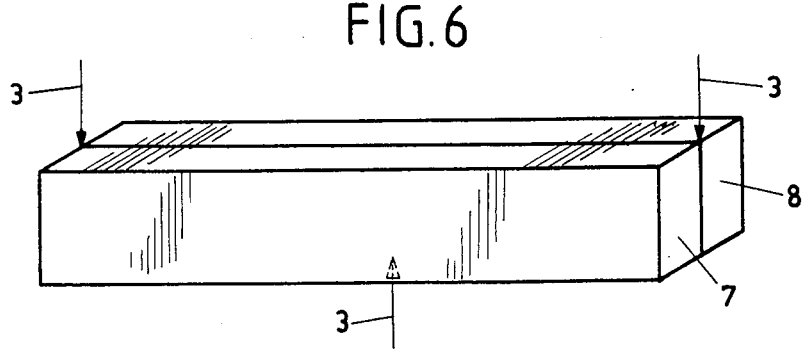
FIG. 6, an article according to FIG. 5 following application of the external load in the low temperature range.

FIG. 6 shows the article according to FIG. 5 following application of the external load in the low temperature range for the purpose of inducing the two-way effect. This state corresponds to that of FIG. 2. The reference symbols correspond to those of FIGS. 5 and 2, respectively.

Figure 7:
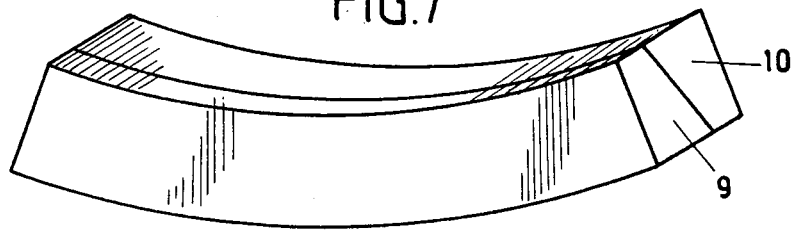
FIG. 7, an article consisting of two shape memory alloys in trapezoidal rod shape bent at the ends in the basic state in the initial position.

In FIG. 7, an article consisting of two shape memory alloys A and B is represented in the shape of trapezoidal profiles 9 and 10 bent at the ends. Such sections, asymmetrical as regards the main axes, can be applied when three-dimensional movements are to be achieved.

Figure 8:
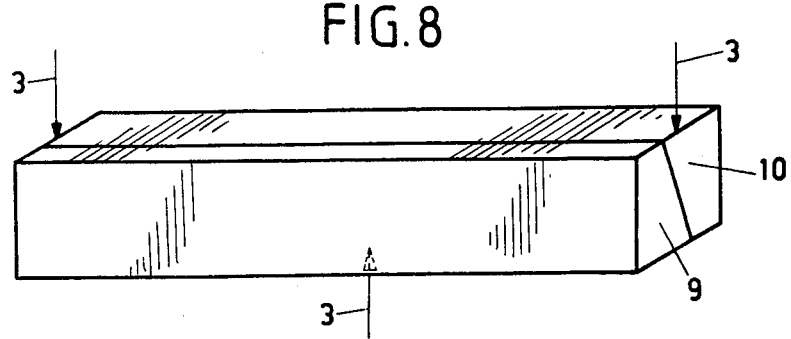
FIG. 8, the article according to FIG. 7, following application of the external load in the low temperature range.

FIG. 8 shows the article according to FIG. 7 following application of the external load in the low temperature range. Otherwise, the figure corresponds to FIG. 6.

Figure 9:
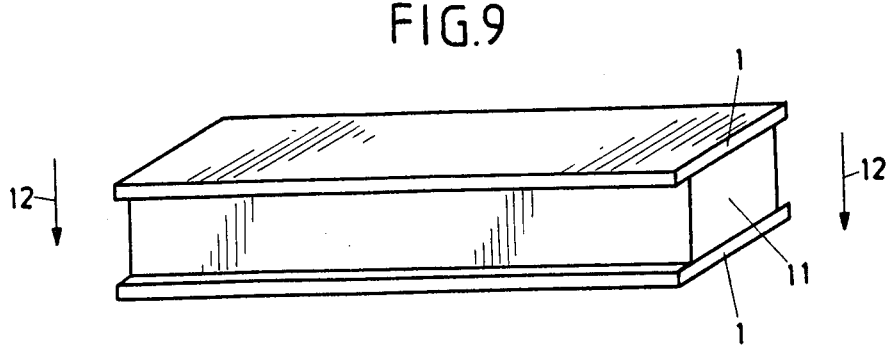
FIG. 9, an article consisting of two straight strips of a first shape memory alloy and a rod of a second shape memory alloy lying between them in the basic state in the initial position.

FIG. 9 shows an article consisting of two straight strips 1 of a first shape memory alloy A and a straight rod 11 of a second shape memory alloy B lying between them in the basic state and in the initial position. The shape memory alloy B, here as a rod 11, is made of a lesser width than the strips 1. Of course, the reverse could also be the case or 1 and 11 could have the same width. 12 indicates the direction of the external load required for the deformation in the low temperature range. In the case of the flexible rod, this is generally a binding moment.

Figure 10:
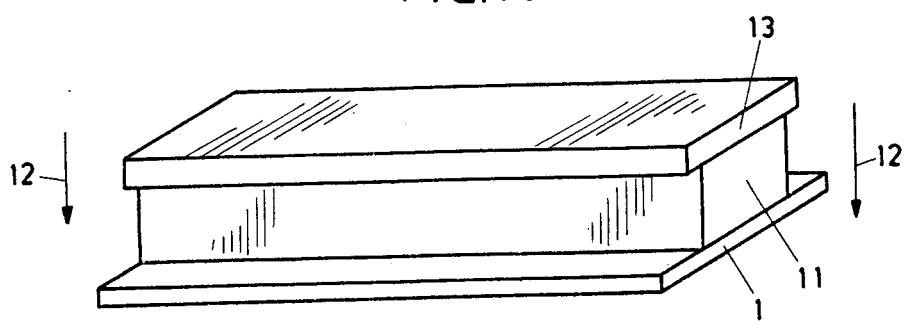
FIG. 10, an article consisting of three shape memory alloys in straight strip or rod shape in the basic state in the initial position.

FIG. 10 shows an article consisting of three shape memory alloys in straight strip and rod shape, respectively, in the basic state in the initial position. 1 and 11 correspond to FIG. 9, while 13 represents a shape memory alloy C in strip shape. The other reference symbols and conditions correspond to those of FIG. 9.

Figure 11:
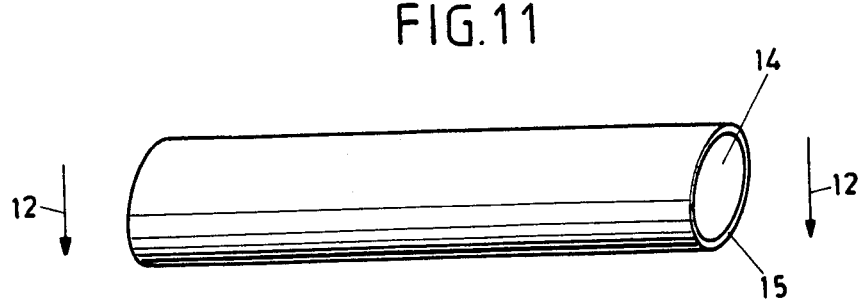
FIG. 11, an article consisting of two shape memory alloys in round rod shape for bending stress in the basic state in the initial position.

In FIG. 11, a composite material consisting of two shape memory alloys is shown in round rod shape for bending stress in the basic state and in the initial position. 14 is a shape memory alloy A in cylindrical shape, while 15 denotes another such alloy B in hollow cylindrical shape.

In FIG. 12, an article consisting of two shape memory alloys in round rod shape for tensile stress is shown. The figure illustrates the application of the external load in the low temperature range by the arrows 3. 16 is the shape memory alloy A in cylindrical shape, 17 the shape memory alloy B in hollow cylinder shape. 16 and 17 can be connected by extrusion or by powder metallurgy methods.

FIG. 13 shows an article consisting of two shape memory alloys in round rod shape for compression stress following application of the external load in the low temperature range. 18 and 19 denote the shape memory alloys A and B, respectively, in cylindrical and hollow cylinder shape, respectively. 3 again represents the direction of the applied external load.

FIG. 14 represents an article consisting of two shape memory alloys in round rod shape for tension/compression stress. The perspective representation shows the state following application of the external load in the low temperature range and prior to the joining of the individual parts. 20 denotes a shape memory allow A in cylindrical shape, 21 a shape memory alloy B in hollow cylinder shape, 3 marks the direction of the load.

FIG. 15 shows the article according to FIG. 14 in plan view and section. The corresponding front edges of 20 and 21 are cut off in preparation for the welding seam. The reference symbols exactly correspond to those of FIG. 14.

FIG. 16 represents the article according to FIG. 15 after the joining together of the individual parts in the initial position (low temperature range). 22 is the front welding seam which guarantees the firm connection of the individual parts. The other reference symbols correspond to those of FIG. 15.

In FIG. 17, the article according to FIG. 16 is represented during the passage of the transition in the high temperature range of the first shape memory alloy A. 4 shows the direction of the internal deformation of 20 in temperature range $A_S$ to $A_F$ of the shape memory alloy A, in this case a contraction. 5 is the direction of the external movement. The remaining reference symbols correspond to those of FIG. 16.

In FIG. 18, the article according to FIG. 16 is represented during the passage of the transition in the high temperature range of the second shape memory alloy B. Double arrow 6 indicates the internal expansion of 21, in other words the internal deformation between $A_S$ and $A_F$. 5 is the corresponding direction of movement (elongation). The other reference symbols correspond to those of FIG. 16.

FIG. 19 shows an article consisting of two shape memory alloys in sheet and plate shape for three-dimensional bending following application of the external load in the low-temperature range, in the state prior to the joining of the individual parts. 23 is the tensile-stressed shape memory alloy A, 24 the compression-stressed shape memory alloy B. To achieve the state of the latter, in general a compressing device is required to prevent buckling sideways. Arrows 3 indicate the direction of the applied load.

FIG. 20 represents the article according to FIG. 19 following the joining of the individual parts in the initial position. Joining must take place in the entire interface of 23 and 24 and must be carried out in the low temperature range of both shape memory alloys A and B. This can be done, e.g., by means of a plastic binder hardening at a low temperature.

Figure 21:
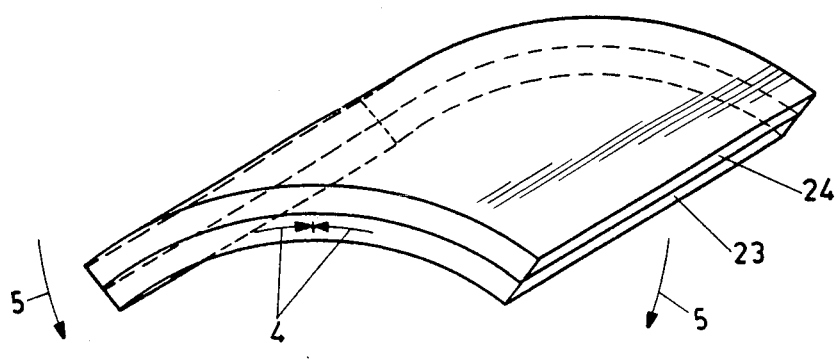
FIG. 21, the article according to FIG. 20 during the passage of the transition in the high temperature range of the first shape memory alloy.

In FIG. 21, the article according to FIG. 20 is shown during the passage of the transition in the high temperature range of the first shape memory alloy A. 23 contracts, which is indicated by the double arrow 4. Because of this internal contraction, the article bends and its external peripheries at the front perform a movement according to the direction of arrow 5. As a result, the article takes on an arched shape.

Figure 22:
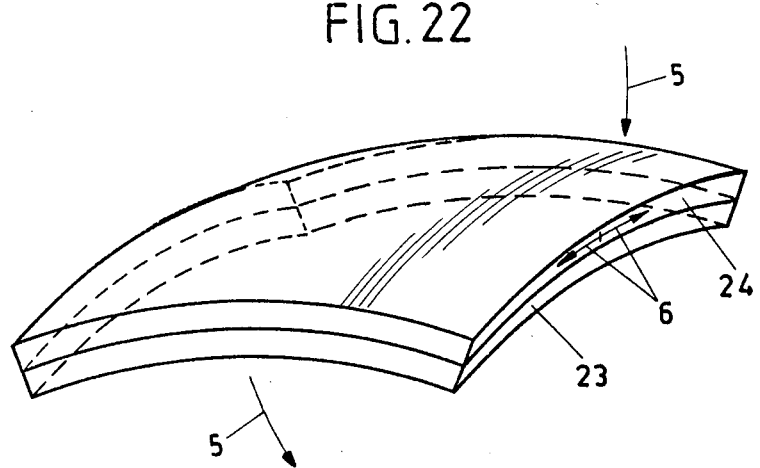
FIG. 22, the article according to FIG. 20 during the passage of the transition in the high temperature range of the second shape memory alloy.

FIG. 22 shows the article according to FIG. 20 during the passage of the transition in the high temperature range of the second shape memory alloy B. Double arrow 6 indicates the internal expansion of 24 between the temperature limits $A_S$ and $A_F$. Arrows 5 indicate the corresponding external movement of the peripheries. The article assumes nearly the shape of an arch. The bending of the arch represented in FIG. 21 thus is partially undone, which is caused by the internal mechanical balance. The article again becomes more flat but is now bent three dimensions.

FIG. 23 shows an article consisting of two shape memory alloys in round rod shape for tensile/compression stress following application of the external load in the low temperature range, in the state prior to the joining of the individual parts in perspective representation. 25 is a shape memory alloy A in cylindrical shape, 26 a shape memory alloy B in hollow cylinder shape. 3 is the direction of the external load to achieve the corresponding deformation. In this process 25 is oriented by tension, while 26 is twisted by a certain angle by means of torsion. The latter is indicated by dash-dot lines.

FIG. 24 shows the article according to FIG. 23 in plan view and section. To prepare the welding seam, the corresponding edges of 25 and 26 are cut off. Otherwise, the reference symbols correspond to those of FIG. 23.

In FIG. 25, the article according to FIG. 23 is represented after joining the individual parts in the initial position (low temperature range). 22 is the front seam to guarantee the firm connection of the individual parts. Cf. FIG. 16. The other reference symbols are the same as those in FIG. 23.

In FIG. 26, the article according to FIG. 25 is represented during the passage of the transition in the high temperature range of the first shape memory alloy A. The direction of the internal deformation (contraction) of 25 in the temperature range between $A_S$ and $A_F$ of the shape memory alloy A is indicated by double arrow 4. 5 indicates the direction of the external movement (shortening of the longitudinal axis).

FIG. 27 shows the article according to FIG. 25 during the passage of the transition in the high temperature range of the second shape memory alloy B. Arrows 6 following the circumferential direction indicate the internal deformation of 26, in this case a sliding in the direction of thrust. The corresponding external direction of movement (twisting) is indicated by arrow 5.

As regards this article, basically two cases are to be distinguished, which is also reflected in the corresponding production process:

In all cases in which the type of movement of the indicated parts of the article is the same (e.g., bending only, tension only, compression only, torsion only), the article can be, so to speak, monolithic. It can be produced in the basic state in practically any shape (rod, strip, plate, tube). The joining of the individual parts of the article can then take place at any temperature, preferably in a warm state prior to the inducing of the low temperature phase creating the two-way effect. Rolls (roll-bond), compression molding, extrusion, welding, soldering, diffusion joining or powder metallurgy methods are available for that purpose. Moreover, random, more or less continuous transition zones can be applied between individual parts. This can be done by diffusion heat treating or already in the powder metallurgy production by appropriate dosing of the various powders. Of course, the joining can also take place by bonding the shape memory alloys in the low temperature range.

In all cases in which the manner of movement of the individual parts of the article differs (e.g., tension in one, compression or torsion in another part), the action to induce the martensitic low temperature phase making the two-way effect possible must take place individually and separately in every part of the material prior to joining. This relates especially to the corresponding deformation to be carried out in the low temperature range. Then the joining must also occur in the low temperature range and can be accomplished merely by bonding or local welding (spotwelding, fusing of fronts, fusing by means of end plates, etc.). It should be evident that an already monolithic article (e.g., a round rod) would resist any simultaneous introduction of different types of deformation (e.g., only tension in the core sheet, only torsion in the shell).

EXAMPLE I

See FIGS. 1 to 4:

An article in the shape of a prismatic flexible rod was produced as follows:

A strip 1, 2.5 mm wide, 1.2 mm thick and 35 mm long from a shape memory alloy A was connected with a strip 2 of the same dimensions from a shape memory alloy B by hot-rolling (roll-bond) into a flexible rod 2.5 mm wide, 2.4 mm high and 35 mm long. The shape memory alloy A (strip 1) was of the Ni/Ti type and had the following composition:

Ti=45.5% by weight
Cu=10% by weight
Ni=remainder

The transition tempertures were $A_S=70°$ C. and $A_F=95°$. The shape memory alloy B (strip 2) belonged to the β-brass type and was composed of the following:
Al = 14.4% by weight
Ni = 3.2% by weight
Cu = remainder The transition temperatures were $A_S=120°$ C. and $A_F=150°$ C. The article was subjected to solution heat treatment for ½ h at 850° C. and then quenched in ice water. To create the shape memory effect, the article was then deformed in the low temperature range (martensitic phase) by bending by 7.5% related to the core fiber, so that it assumed approximately the shape of FIG. 2. While maintaining the load indicated by arrows 3, the article was heat treated for ½ h at 300° C. and then cooled to room temperature. Thus the state was achieved that made possible the reversible two-way effect in both parts of 1 and 2 of the bent flexible rod. By heating the flexible rod in the temperature range of 70° to 95° C., the shape memory effect could be noted in the expansion of the strip 1. The article assumed the shape of FIG. 3. With further heating to more than 120° C., the flexible rod straightened out even more and finally took on the flat shape of FIG. 4. Following cooling to room temperature, a complete return of the flexible rod to the initial position could be noted. Repeated temperature cycles demonstrated complete reproducibility of the effect.

EXAMPLE II

See FIG. 12

An article in the shape of a round tension bar was produced as follows:

a 10-mm diameter cylindrical rod 16 from a shape memory alloy A was inserted into a hollow cylinder tube 17 with 14-mm exterior diameter and 10-mm interior diameter from a shape memory alloy 13 and the whole unit was placed in warm state into the receiver of an extrusion press. The matrix had a 7-mm diameter circular opening. At a temperature of 850° C. and a reduction ratio of 1:4, an article in the shape of a 7-mm diameter round rod was produced. The shape memory alloys A and B corresponded in their composition and properties exactly to those of example I. The tension bar was solution heat treated for ½ hour at 850° C. and then quenched in ice water. Now the material was stretched 7.5% at 0° C. by a tensile stress applied in the longitudinal axis and heat treated for ½ h at 300° C. while maintaining the load. Following cooling and unloading, the article was ready for use for the shape memory effect. Its course—this time a change in length in the longitudinal direction—could be observed analogously as in the case of example I. When heated, the tension rod step-by-step became shorter while it again expanded when cooled down.

EXAMPLE III

See FIG. 11

An article in the shape of a round flexible rod was produced as follows:

A powder metallurgical method was applied. A thin-walled copper tube of 15 mm exterior diameter and 0.15 mm wall thickness was placed into a stiff rubber tube of 20 mm interior diameter. A powder mixture from a shape memory alloy A was filled into the copper tube, while the interspace between the copper tube and the rubber tube was poured from a powder mixture from shape memory alloy 13. Both shape memory alloys belonged to the β-brass type. The alloy A had the following composition and transition temperatures:
Al = 14.7% by weight
Ni = 3.2% by weight
Cu = 82.1% by weight
$A_S=100°$ C.
$A_F=130°$ C.

Alloy B had the following composition and transition temperatures:
Al = 14.2% by weight
Ni = 3.2% by weight
Cu = 82.6% by weight
$A_S=150°$ C.
$A_F=180°$ C.

The powder filling in the rubber tube was transformed by cold isostatic molding into a precompressed blank which was sintered twice in succession in the argon flow. The sintered compact produced in this manner was covered by a shell (capsule) of steel ad completely compressed by swaging at a temperature of 850° C. Subsequently the steel shell was removed by overtwisting the round rod. The composite material now available as round rod, consisting of the cylinder 14 (alloy A) and the hollow cylinder 15 (alloy B) was heat treated for ½ h at 850° C. and quenched in ice water. Thereupon the round rod was bent at room temperature, so that its deformation related to the core fiber amounted to 6.5%. While maintaining the load, the bent rod was then heat treated for ½ h at 300° C., unloaded and cooled. By passage through a temperature cycle between room temperature and about 200° C., it was possible to ascertain a step-by-step reversible two-way effect similar to example I in the above-cited temperature range.

EXAMPLE IV

See FIGS. 23 to 27

An article in the shape of a tension/torsion rod was produced as follows:

An 8-mm diameter cylindrical rod 25 from a shape memory alloy A was heat treated for 15 minutes at a temperature of 850° C., quenched in ice water and stretched 6.5% by tension at room temperature by external load. While maintaining the axial tension load, the rod was heat treated for ½ h at 270° C., unloaded and cooled. The shape memory alloy A had the following composition and properties:
Al = 14.5% by weight
Ni = 3.2% by weight
C = remainder
$A_S=100°$ C.
$A_F=130°$ C.

A hollow cylinder body 26 of 12 mm exterior and 8 mm interior diameter from a shape memory alloy B was heat treated for ½ h at a temperature of 850° C., quenched in water and twisted in the low temperature range by external axial load, so that the deformation corresponded to an 8% elongation on the external surface. The shape memory alloy B had the following composition and properties
Ti = 45.5% by weight
Cu = 10% by weight
Ni = remainder
$A_S=70°$ C.
$A_F=95°$ C.

On the rod 25, the front edges and on the body 26, the front inside edges were cut off. Then the rod 25 was inserted into the body 26 and frontally fused: welding seam 22. In this process, the mass of the material was constantly cooled so that the heating zones in welding were kept small. By passage through a temperature cycle, the step-by-step two-way effect could be observed: At first, in heating a twisting (FIG. 27) occurred which was superimposed by a curtailment (FIG. 26) with further heating. Inverse sequence as that shown in the figures.

The invention is not limited to the above embodiments. From FIGS. 1-27 and their combinations, there result numerous additional embodiment variants (cf. also description of figures).

The article need not necessarily consist of two shape memory alloys with different transition temperatures. It may just as well consist of several parts (at least two of them) from one end and the same alloy, whereby, however, every individual part represents for itself an individual mode of movement made different from others. On the other hand, the article is not limited to only two shape memory alloys or to only two parts. In principle, it can consist of any number of shape memory alloys and of any number of parts. Therefore, practically unlimited movement magnitudes as a function of the temperature can be put together; also three-dimensional movements are possible. Practically all types of movements, such as changes in length by tension, compression, then bending and twisting can be combined.

Preferred embodiments of a composite material are those that consist from one part of a Ni/Ti/Cu type shape memory alloy with transition temperatures $A_S$ in the 50° to 70° C. range and from another part from a Cu/Al/Ni type shape memory alloy with transition temperatures $A_S$ in the 100° to 120° C. range.

We claim:

1. An article having reversible thermomechanical properties, comprising at least two parts, whereby each part has a memory effect, wherein the entire article is made up of at least one shape memory alloy having a two-way effect.

2. The article of claim 1, wherein the individual parts have different transition temperatures.

3. The article of claim 1, wherein at least two parts have equal transition temperatures.

4. The article of claim 1, wherein each part has different types and values of deformation and is capable of varied movements.

5. The article of claim 1, wherein the said article is a flexible rod comprising two parts, each made of a one shape memory alloy.

6. The article of claim 5, wherein the flexible rod has a flat, diagonal, standing on end, trapezoidal or circular cross section.

7. The article of claim 1, wherein the said article is a flexible rod comprising more than two parts made of one shape memory alloy each connected in a longitudinal direction.

8. The article of claim 1, wherein the said article is in the shape of a tension rod or a compression rod, comprising two parts of one shape memory alloy each connected with one another in a longitudinal direction.

9. The article of claim 1, wherein the said article is in the shape of a tension/compression rod comprising two parts of one shape memory alloy each connected with one another at the front.

10. The article of claim 1, wherein the said article is a sheet metal or plate, comprising two stratified parts of one shape memory alloy each, connected with one another over their entire surface.

11. The article of claim 1, wherein the said article in the shape of a tension/torsion rod, comprising two parts of one shape memory alloy, connected with one another on their fronts.

12. The article of claim 1, wherein one part is made up of a Ni/Ti/Cu type shape memory alloy with a comparatively low transition temperature $A_S$ in the range of 50° to 70° C. and at least one other part of a Cu/Al/Ni type shape memory alloy with a comparatively higher transition temperature $A_S$ in the 100° to 120° C. range.

13. The article of claim 1, wherein the said article is in the shape of a rod, a tube, a strip, a sheet or a plate.

14. A process for the production of an article having reversible thermomechanical properties, wherein the article comprises at least two parts, each having a memory effect and each of the said parts being of at least one shape memory alloy having a two-way effect; said process comprising joining together the said parts having a memory effect by rolling, welding, soldering, pressing, brazing, extrusion, compression molding, diffusion joining or powder metallurgy.

15. The process of claim 14, wherein the said composite material is in the shape of a rod, a tube, a strip, a sheet or a plate.

16. The process of claim 14, wherein the said process comprises, after joining of the said parts, subjecting the said article to a thermal treatment and a mechanical deformation to induce a two-way effect.

17. The process of claim 14, comprising:
 (i) subjecting the said parts individually to a thermal treatment and a mechanical deformation to induce a two-way effect so that the individual parts are exposed to a different type of deformation; and,
 (ii) joining the said parts by bonding or local fusing to form the said article.

* * * * *